United States Patent
Anjaneyaswamy et al.

(10) Patent No.: US 12,095,061 B2
(45) Date of Patent: Sep. 17, 2024

(54) SYSTEMS AND METHODS FOR ELECTRIC VEHICLE POWERTRAIN THERMAL MANAGEMENT AND CONTROL

(71) Applicant: Nikola Corporation, Phoenix, AZ (US)

(72) Inventors: Namitha Anjaneyaswamy, Phoenix, AZ (US); Girish Barade, Wooster, OH (US); Brandon Dunn, Gilbert, AZ (US); Behrooz Karimi, Tyler, TX (US); Akshit Markan, Tempe, AZ (US); Derek McVay, Phoenix, AZ (US); Shervin Shoai Naini, San Francisco, CA (US); Aris Papadopoulos, Mesa, AZ (US)

(73) Assignee: Nikola Corporation, Phoenix, AZ (US)

( * ) Notice: Subject to any disclaimer, the term of this patent is extended or adjusted under 35 U.S.C. 154(b) by 0 days.

(21) Appl. No.: 18/465,234

(22) Filed: Sep. 12, 2023

(65) Prior Publication Data

US 2024/0097231 A1    Mar. 21, 2024

Related U.S. Application Data

(60) Provisional application No. 63/375,478, filed on Sep. 13, 2022.

(51) Int. Cl.
| | |
|---|---|
| *H01M 10/625* | (2014.01) |
| *H01M 10/613* | (2014.01) |
| *H01M 10/6568* | (2014.01) |
| *H01M 10/667* | (2014.01) |

(52) U.S. Cl.
CPC ..... *H01M 10/625* (2015.04); *H01M 10/6568* (2015.04); *H01M 10/667* (2015.04); *H01M 10/613* (2015.04)

(58) Field of Classification Search
None
See application file for complete search history.

(56) References Cited

U.S. PATENT DOCUMENTS

| | | | |
|---|---|---|---|
| 11,274,595 B1* | 3/2022 | Farhat | F01P 5/02 |
| 2014/0026831 A1 | 1/2014 | Mahrs et al. | |
| 2021/0046848 A1 | 2/2021 | Bellino et al. | |
| 2021/0065481 A1* | 3/2021 | Zang | G05B 23/0283 |
| 2021/0332738 A1 | 10/2021 | Akiyama et al. | |
| 2022/0266680 A1* | 8/2022 | Yao | H02P 29/60 |

OTHER PUBLICATIONS

ISA; International Search Report and Written Opinion dated Dec. 12, 2023 in Application No. PCT/US2023/073949.

* cited by examiner

*Primary Examiner* — Scott J. Chmielecki
(74) *Attorney, Agent, or Firm* — Snell & Wilmer L.L.P.

(57) ABSTRACT

The present disclosure provides a method of managing thermal loads in the powertrain of an electric vehicle and controlling various electronic components of a powertrain thermal management system. The method may include heating a coolant of a powertrain coolant loop utilizing waste heat from a liquid-cooled powertrain component (e.g., an electric motor, a DC-DC converter, etc.), measuring a coolant temperature, and utilizing combined feedforward and feedback control methods for different components (pump(s), radiator fan(s), valve(s)) of the powertrain thermal management system.

7 Claims, 8 Drawing Sheets

SYSTEMS AND METHODS FOR ELECTRIC VEHICLE POWERTRAIN THERMAL MANAGEMENT AND CONTROL

CROSS-REFERENCE TO RELATED APPLICATION

This application claims priority to, and the benefit of, U.S. Provisional Patent Application No. 63/375,478 filed on Sep. 13, 2022 entitled "SYSTEMS AND METHODS FOR ELECTRIC VEHICLE POWERTRAIN THERMAL MANAGEMENT AND CONTROL." The disclosure of the foregoing application is incorporated herein by reference in its entirety, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure relates to thermal management systems, and more particularly, to thermal management control systems for electric vehicles.

BACKGROUND

Fuel cell electric vehicles (FCEVs) utilize multiple fuel cells, combined in what is known as a fuel cell stack, to generate an electric current to power one or more system components to operate the vehicle. For example, the electric current generated by the fuel cell stack may be used to charge an onboard battery system that may be used to power one or more electric motors to drive the vehicle's wheels as well as power multiple other electrically operated systems of the vehicle. Similarly, modern battery electric vehicles (BEVs) also include a battery system capable of storing energy to be used to power the electric vehicle. For example, electric current provided to the battery system by an electrical grid may be used to power one or more electric motors to drive the vehicle's wheels as well as power other electrically operated systems of the vehicle. In electric vehicles (FCEVs and/or BEVs), various powertrain components (e.g., electric motors among others) generate substantial waste heat. Accordingly, systems and methods that efficiently cool these powertrain components in order to maximize system lifespan and performance are desirable.

SUMMARY

A method of managing powertrain thermal loads in an electric vehicle is disclosed, including heating a coolant of a powertrain coolant loop utilizing waste heat from an electric motor and/or a DC-DC converter, measuring a first coolant temperature, measuring an ambient air temperature, calculating a coolant flow rate of the coolant, calculating a powertrain heat generation, calculating a feedback portion of a fan speed command using the first coolant temperature, calculating a feedforward portion of the fan speed command using the ambient air temperature, the coolant flow rate of the coolant, and the powertrain heat generation, and controlling a fan speed of a radiator fan for the powertrain coolant loop based upon the feedback portion of the fan speed command and the feedforward portion of the fan speed command.

The coolant flow rate may be calculated using a pump speed of a coolant pump, a flow split valve position, and a bypass valve position. The powertrain heat generation may be calculated using a speed of the electric motor and a torque of the electric motor. The controlling the fan speed may comprise sending the fan speed command to the radiator fan, wherein the fan speed command comprises a sum of the feedback portion of the fan speed command and the feedforward portion of the fan speed command. The method may further comprise measuring a second coolant temperature downstream from the DC-DC converter, measuring a third coolant temperature downstream from the electric motor, performing a proportional-integral-derivative (PID) control using a maximum value of the second coolant temperature and the third coolant temperature to generate a PID output variable, and calculating a pump speed command using the PID output variable and at least one of a lookup table or a polynomial expression.

In various embodiments, the powertrain heat generation may be calculated further using a speed of a second electric motor and a torque of the second electric motor. The bypass valve may be located downstream from the radiator and upstream from the electric motor; though in various embodiments the bypass valve is located upstream from the radiator. The method may further comprise sending the pump speed command to a coolant pump to regulate a flow of the coolant. The powertrain coolant loop may comprise a flow split valve, and the method may further comprise measuring a second coolant temperature at an outlet of a DC-DC converter, calculating a difference between a DC-DC outlet temperature setpoint and the second coolant temperature to calculate an error value, performing a proportional-integral-derivative (PID) control using the error value to generate a PID output variable, calculating a flow split valve command using the PID output variable and at least one of a lookup table or a polynomial expression, and controlling a position of the flow split valve based upon the flow split valve command to regulate a flow of the coolant through the DC-DC converter.

A method of managing thermal loads in an electric vehicle is disclosed, including heating a coolant of a powertrain coolant loop utilizing waste heat from an electric motor and/or a DC-DC converter, measuring a first coolant temperature, calculating a difference between a pump outlet coolant temperature setpoint and the first coolant temperature to calculate a first error value, performing a proportional-integral-derivative (PID) control using the first error value to generate a PID output variable, calculating a feedback portion of a fan speed command using the PID output variable and at least one of a lookup table or a polynomial expression, and controlling a fan speed of a radiator fan for the powertrain coolant loop based upon the feedback portion of the fan speed command. The method may further comprise measuring an ambient air temperature, calculating a coolant flow rate of the coolant, calculating a powertrain heat generation, calculating a radiator temperature differential by determining a difference between a radiator inlet coolant temperature setpoint and the measured ambient air temperature, calculating a desired radiator air flow using the radiator temperature differential, the powertrain heat generation, and the coolant flow rate, calculating a feedforward portion of the fan speed command using a vehicle speed and the desired radiator air flow, and controlling the fan speed of the radiator fan for the powertrain coolant loop further based upon the feedforward portion of the fan speed command. The method may further comprise calculating the fan speed command by adding the feedforward portion of the fan speed command to the feedback portion of the fan speed command. The method may further comprise applying a low pass filter to the feedforward portion of the fan speed command before the feedforward portion of the fan speed command is added to the feedback portion of the fan speed command. The first coolant temperature may be measured at an outlet of a coolant pump. The coolant flow rate may be calculated using a pump speed of a coolant pump, a flow split valve position, and a bypass valve position. The powertrain heat generation may be calculated using a speed of the electric motor and a torque of the electric motor.

A thermal management system for an electric vehicle is disclosed, comprising an electric motor, a DC-DC converter fluidly coupled in parallel with respect to the electric motor, a radiator fluidly coupled to the electric motor and the DC-DC converter, a radiator fan, a bypass valve fluidly coupled to the radiator, a coolant pump fluidly coupled to the bypass valve, a flow split valve fluidly coupled in series with the DC-DC converter, and a controller in electronic communication with the radiator fan, wherein the controller is configured to utilize both a feedforward control of the radiator fan and a feedback control of the radiator fan. In a radiator mode position, the bypass valve is configured to route a coolant through the radiator. In a bypass mode position, the bypass valve is configured to route the coolant to bypass the radiator.

In various embodiments, the controller utilizes the feedforward control by receiving an ambient air temperature, a coolant flow rate of the coolant, and a powertrain heat generation for controlling the radiator fan. The controller may utilize the feedback control by receiving a coolant temperature from a coolant temperature sensor for controlling the radiator fan. The thermal management system may further comprise an inverter for the electric motor, an air compressor, a brake resistor controller, and an expansion tank. The controller may be further configured to control a position of the bypass valve based upon a coolant temperature at an outlet of the coolant pump, control a position of the flow split valve based upon a coolant temperature at an outlet of the DC-DC converter, and regulate a speed of the coolant pump based upon a coolant temperature at an outlet of the electric motor and the coolant temperature at an outlet of the DC-DC converter.

The contents of this section are intended as a simplified introduction to the disclosure and are not intended to limit the scope of any claim. The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain exemplary principles of the disclosure.

DETAILED DESCRIPTION

Figure 1:
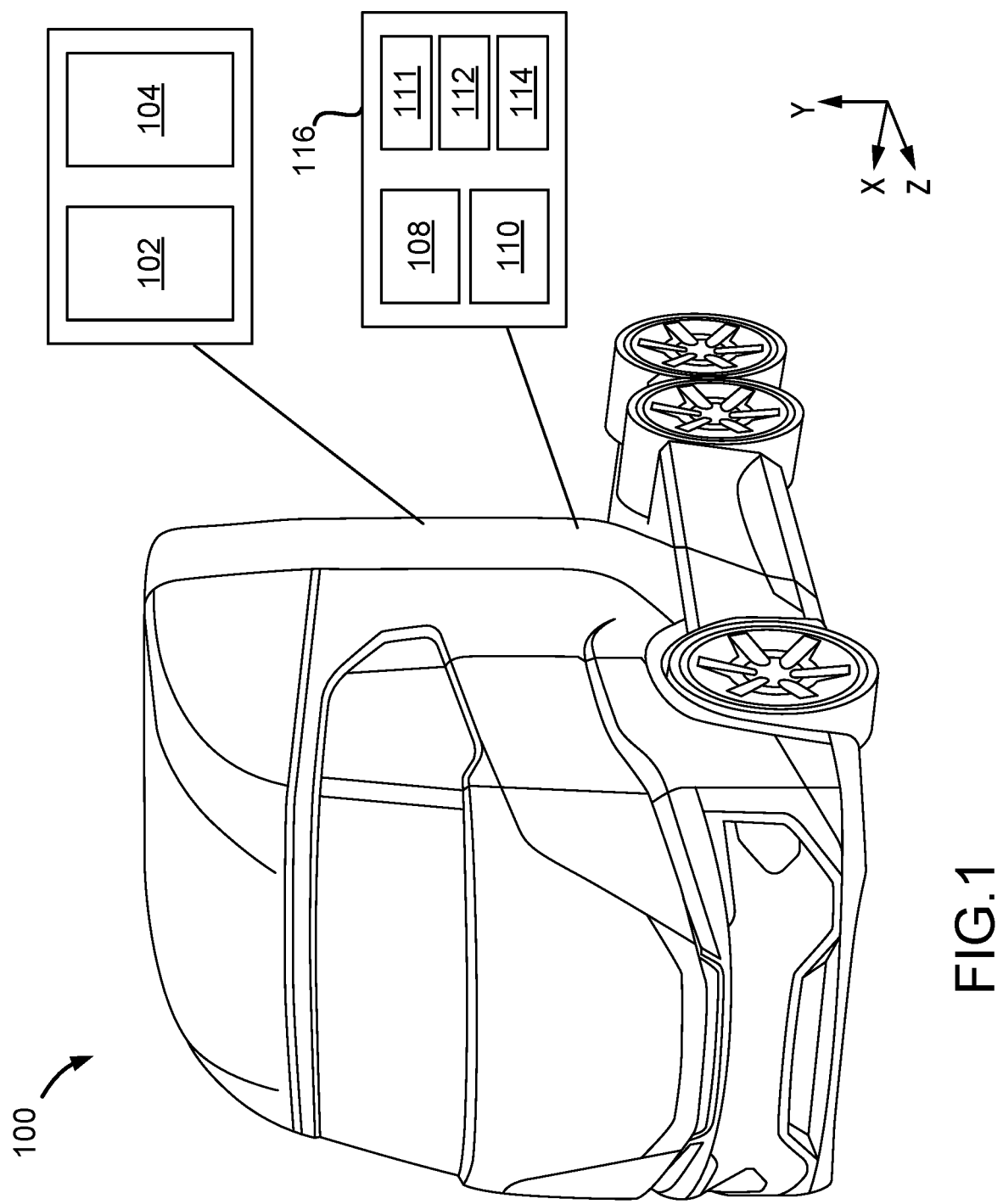
FIG. 1 illustrates a perspective view of an electric vehicle containing a thermal management system, in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any suitable order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with electric vehicles, fuel cell electric vehicles, battery electric vehicles, compressed natural gas (CNG) vehicles, hythane (mix of hydrogen and natural gas) vehicles, and/or the like. However, various aspects of the disclosed embodiments may be adapted for performance in a variety of other systems. Further, in the context of the present disclosure, methods, systems, and articles may find particular use in any system requiring use of liquid-cooled powertrain components such as electric motors, electric power control components (e.g., converters and/or inverters), and/or thermal management system(s) of the same. As such, numerous applications of the present disclosure may be realized.

The following nomenclature in Table 1, Table 2, and Table 3 corresponds to measured parameters, controlled parameters, and selected parameters, respectively, described in the present disclosure:

TABLE 1

Sensor Measurements

| Measurement Sensor | Description |
| --- | --- |
| $T_{mot,1}$ | Coolant temperature at outlet of E-motor 1 (° C.) |
| $T_{mot,2}$ | Coolant temperature at outlet of E-motor 2 (° C.) |
| $T_{DCDC}$ | Coolant temperature at outlet of DC-DC converter (° C.) |
| $T_{p,out}$ | Coolant temperature at outlet of pump (° C.) |
| $T_{amb}$ | Ambient temperature (° C.) |
| $Speed_{mot,1}$ | E-motor 1 speed (RPM) |
| $Torque_{mot,1}$ | E-motor 1 torque (N-m) |
| $Speed_{mot,2}$ | E-motor 2 speed (RPM) |
| $Torque_{mot,2}$ | E-motor 2 torque (N-m) |
| $Speed_{veh}$ | Vehicle speed (kph) |

TABLE 2

Controlled Parameters

| Controlled Parameter | Description |
| --- | --- |
| $N_{fan}$ | Radiator fan speed (RPM) |
| $N_{pump}$ | Powertrain loop pump speed (RPM) |
| $V_{pos,2}$ | Flow split (2-way) valve (%) |
| $V_{pos,3}$ | Bypass (3-way) valve (%) |

TABLE 3

Selected/Calculated Parameters

| Selected/Calculated Parameter | Description |
| --- | --- |
| $T_{threshold}$ | Threshold coolant temperature (° C.) |
| $T_{setpoint\_1}$ | Component outlet temperature setpoint (° C.) |
| $T_{setpoint\_2}$ | DC-DC outlet temperature setpoint (° C.) |
| $T_{setpoint\_3}$ | Pump outlet temperature setpoint (° C.) |
| $Q_{powertrain}$ | Powertrain heat generation (kW) |
| $V_{coolant}$ | Powertrain loop coolant flow (LPM) |
| $V_{air}$ | Desired radiator air flow (LPM) |

Modern electric vehicles may utilize various power sources to provide electric current to one or more electric motors configured to drive the vehicle's wheels. Among the types of electric vehicles currently being researched and developed at a wide scale are FCEVs and BEVs. Similar to traditional internal combustion engine vehicles (ICEVs), electric vehicles may generate large amounts of waste heat through the operation of various system components. For example, powertrain systems such as electric motors may generate waste heat as a result of losses within the winding(s), bearing losses, core losses, and/or circulation (windage) losses. Various other powertrain components (e.g., DC-DC converters and the like) may similarly generate waste heat. This additional heat can adversely impact the operation of the powertrain component and reduce the life thereof. Accordingly, modern electric vehicles are typically equipped with one or more thermal management systems capable of managing the operating temperatures of various system components. By increasing the thermal efficiency of the thermal management system, certain components of the thermal management system may require less power from on-board batteries. As a result, battery capacity may be preserved and instead be utilized for other desirable purposes, for example to increase vehicle range.

Accordingly, with reference to FIG. 1, a perspective view of a vehicle 100 incorporating a thermal management system is illustrated, in accordance with various embodiments. Vehicle 100 is an FCEV incorporating an electric powertrain. More specifically, vehicle 100 is an electric commercial vehicle, such as, for example, a class 8 heavy duty commercial vehicle. While described herein as an FCEV, vehicle 100 is not limited in this regard and may comprise any type, size, or function of vehicle. For example, vehicle 100 may comprise a BEV, CNG vehicle, hythane vehicle, or any other suitable vehicle. Moreover, vehicle 100 may comprise a commercial vehicle of a different weight class or a passenger vehicle in various embodiments. It should be appreciated that vehicle 100 may comprise any vehicle type that can utilize a thermal management system wherein waste heat from certain system components may be at least partially salvaged and/or dissipated through a liquid coolant loop as discussed in further detail below.

With continued reference to FIG. 1, vehicle 100 may comprise a fuel cell stack 102 and a battery 104. Fuel cell stack 102 and/or battery 104 may be configured to power one or more electric motors 108 to drive vehicle 100. For example, fuel cell stack 102 and/or battery 104 may operate alone, in an alternating fashion, and/or in an alternating or staggered fashion to provide current to the one or more electric motors 108 depending on operational objectives or conditions. As a result, fuel cell stack 102 and battery 104 may undergo times of relatively low energy output (corresponding to relatively low heat output) and times of relatively high energy output (corresponding to relatively high heat output). Additionally, battery 104 may undergo periods of elevated heat output responsive to charging of battery 104. While described as having both fuel cell stack 102 and battery 104, vehicle 100 is not limited in this regard and in various embodiments may comprise only battery 104, for example when vehicle 100 is a BEV.

In various embodiments, fuel cell stack 102 may comprise one or more fuel cells capable of facilitating an electrochemical reaction to produce an electric current. For example, the one or more fuel cells may be proton-exchange membrane (PEM) fuel cells which may receive a fuel source (such as diatomic hydrogen gas) which may react with an oxidizing agent (such as oxygen) to generate electricity with heat and water as byproducts. The fuel cells may be electrically coupled in series and/or parallel to increase voltage and/or current and form fuel cell stack 102. In various embodiments, fuel cell stack 102 may comprise fuel cells other than PEM fuel cells, for example, alkaline fuel cells, phosphoric acid fuel cells, molten carbonate fuel cells, solid oxide fuel cells, or any other suitable fuel cell type.

Battery 104 may be a rechargeable, or secondary, battery configured to store energy from an external power source (for example, a charging station), from fuel cell stack 102, from a solar panel disposed on vehicle 100, and/or from regenerative braking or other applications. Battery 104 may release this stored energy in the form of electricity to power one or more electric motors 108 and/or to supply power to other vehicle components utilizing electricity to operate. For example, battery 104 and/or fuel cell stack 102 may power other vehicle components such as an air compressor 110, one or more inverters 111, one or more DC-DC converters 112, a brake resistor controller 114, and so forth. In various embodiments, battery 104 may be a lithium-ion battery; however, battery 104 is not limited in this regard and may comprise other rechargeable battery types such as a lead-acid battery, nickel-cadmium battery, nickel-metal hydride battery, lithium iron sulfate battery, lithium iron phosphate battery, lithium sulfur battery, solid state battery, flow battery, or any other type of suitable battery. Battery 104 may further comprise multiple battery cells coupled in series and/or parallel to increase voltage and/or current. The cells of battery 104 may comprise any suitable structure including cylindrical cells, prismatic cells, or pouch cells. Moreover, battery 104 may at least partially comprise other energy storage technologies such as an ultracapacitor.

In various embodiments, vehicle 100 comprises a thermally managed powertrain arrangement, comprising one or more electric motors 108, air compressor 110, one or more inverters 111, one or more DC-DC converters 112, a brake resistor controller 114, and so forth, and which may be thermally regulated by a powertrain thermal management system 116. In various embodiments, powertrain thermal management system 116 includes one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, as will be discussed in further detail below, powertrain thermal management system 116 is configured to monitor and/or manage temperatures of various powertrain components such as electric motors 108, air compressor 110, inverters 111, DC-DC converters 112, brake resistor controller 114, control electronics of the same, and/or other system components. For example, powertrain thermal management system 116, which can be in thermal communication with electric motors 108, air compressor 110, inverters 111, DC-DC converters 112, brake resistor controller 114, and other system components, may comprise one or more coolant loops configured to transfer thermal energy from areas of higher temperature to areas of lower temperature.

Figure 2:
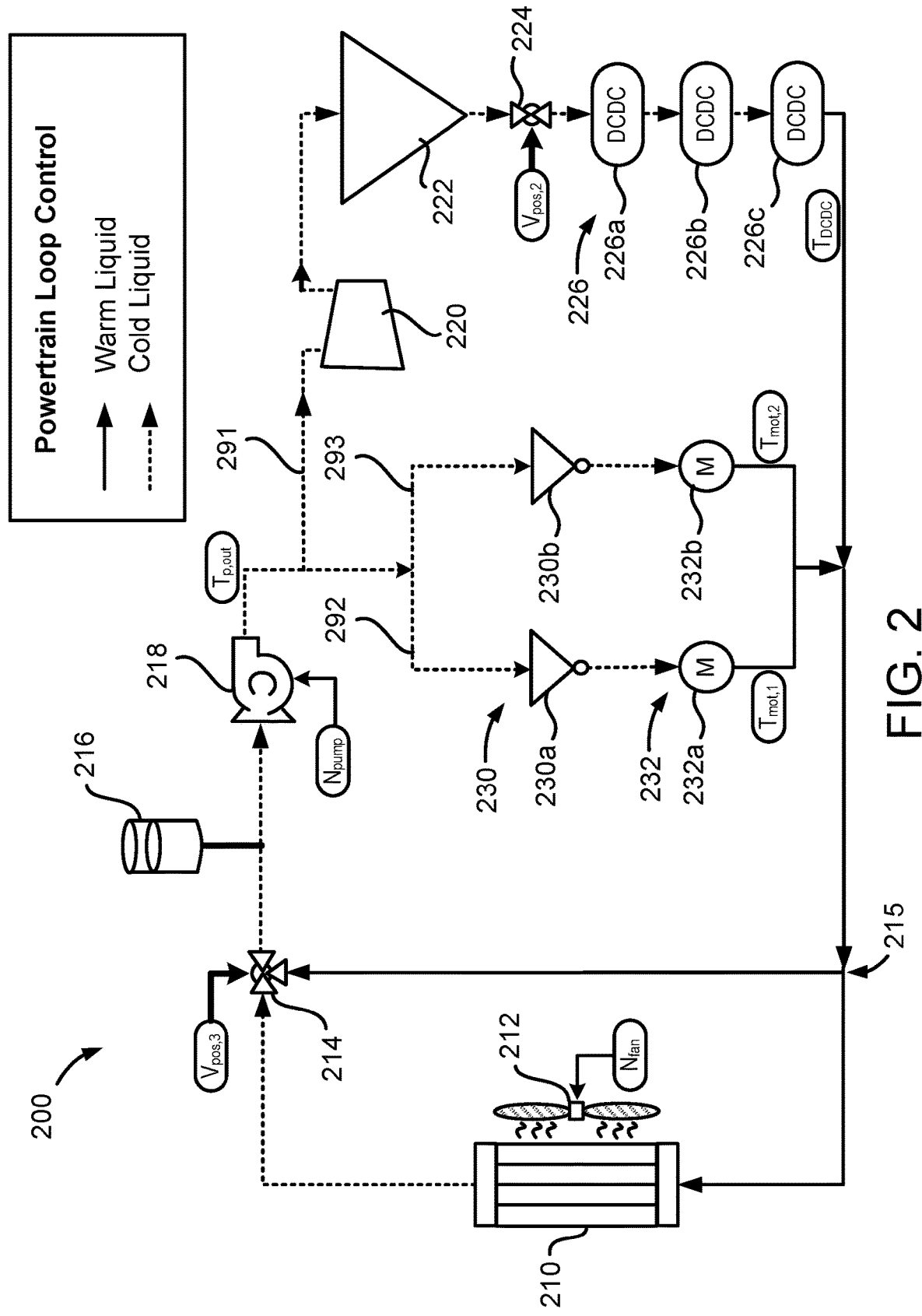
FIG. 2 illustrates a powertrain thermal management system, in accordance with various embodiments.

With reference now to FIG. 2, a powertrain thermal management system 200, which may be similar to powertrain thermal management system 116 of FIG. 1, is illustrated in accordance with various embodiments. In various embodiments, the powertrain thermal management system 200 operates in one of two modes: radiator mode or bypass mode. In the radiator mode, coolant flows through the radiator 210 to reject the heat generated by powertrain components (e.g., electric motors 232, inverters 230, and the like) to the surrounding environment. The bypass mode may be used in colder (e.g., freezing) ambient conditions, where the coolant bypasses the radiator 210 in order to increase its temperature using the heat generated by the powertrain components.

Powertrain thermal management system 200 comprises two types of components, thermally managed components and thermal-hydraulic components. The thermally managed components may include electric motors 232 (e.g., electric motor 232a and electric motor 232b), inverters 230 (e.g., inverter 230a and inverter 230b), air compressor 220, and other electronic components such as DC-DC converters 226 (e.g., DC-DC converter 226a, DC-DC converter 226b, and DC-DC converter 226c) and brake resistor controller 222. The thermal-hydraulic components may include a pump 218, a flow split valve 224 (also referred to as a two-way valve), a bypass valve 214 (also referred to as a three-way valve), a radiator 210 and associated fan 212, and an expansion tank 216.

In various embodiments, air compressor 220, brake resistor controller 222, flow split valve 224, and DC-DC converters 226 are fluidly connected along a first coolant flow path 291 in series. In various embodiments, inverter 230a and electric motor 232a are fluidly connected along a second fluid flow path 292 in parallel with the first coolant flow path 291 (i.e., in parallel with air compressor 220, brake resistor controller 222, flow split valve 224, and DC-DC converters 226). In various embodiments, inverter 230a and electric motor 232a are fluidly connected in series. In various embodiments, inverter 230b and electric motor 232b are fluidly connected in series along a third fluid flow path 293. In various embodiments, inverter 230a and electric motor 232a are fluidly connected in parallel with inverter 230b and electric motor 232b (i.e., the second fluid flow path 292 may be in parallel with the third fluid flow path 293).

To provide desirable cooling capacity for the powertrain components, the thermal-hydraulic electronic components are regulated using feedback and/or feedforward control methodology. Powertrain thermal management system 200 may be configured to remove waste heat from electric motors 232 and/or DC-DC converters 226, among other components, to ensure electric motors 232 and/or DC-DC converters 226 operate within a desired temperature range, for example for efficiency, safety, longevity, reliability, or other desirable purposes. This method may involve a coolant temperature sensor ($T_{p,out}$) at the outlet of the pump 218, coolant temperature sensors ($T_{mot,1}$ and $T_{mot,2}$) at the outlet of each electric motor 232a and 232b, and a coolant temperature sensor ($T_{DCDC}$) at the outlet of the DC-DC converter 226c. Also, the control method may utilize the ambient temperature sensor ($T_{amb}$), which may be located on the truck cab, and internal electric motor (speed, torque) measurements. In various embodiments, the bypass valve 214 is used to toggle the powertrain thermal management system 200 between radiator mode and bypass mode. If the pump outlet temperature ($T_{p,out}$) is greater than the ambient temperature ($T_{amb}$) and greater than a threshold coolant temperature (e.g., $T_{threshold}$ could be 0° C. or another temperature as desired), the bypass valve 214 may transition the powertrain loop to radiator mode. If any of the above conditions are not met, the bypass valve 214 may stay in bypass mode. A block diagram for bypass valve control and mode selection is shown in FIG. 3.

Figure 3:
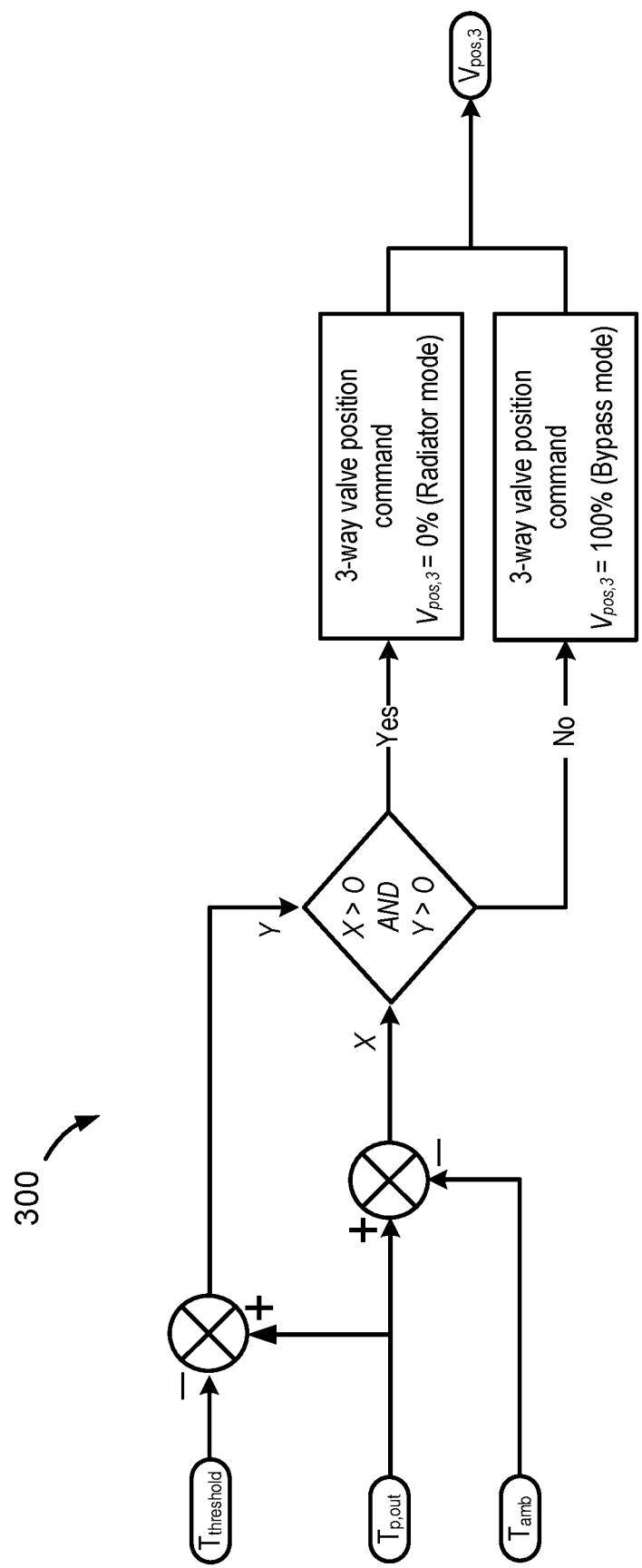
FIG. 3 illustrates a block diagram of control logic for implementing a method for bypass valve control and mode selection, in accordance with various embodiments.

With continued reference to FIG. 3, a block diagram of control logic 300 for a thermal management system (e.g., powertrain thermal management system 200) is illustrated, in accordance with various embodiments. Control logic 300 may implement a method for managing thermal loads in an electric vehicle (e.g., a BEV and/or a FCEV). More specifically, control logic 300 may be implemented for toggling the powertrain thermal management system 200 between radiator mode and bypass mode. With combined reference to FIG. 2 and FIG. 3, control logic 300 may receive a measured coolant temperature (e.g., $T_{p,out}$), also referred to herein as a first coolant temperature. In an exemplary embodiment, the coolant temperature is measured at an outlet of pump 218, though it should be understood that in various embodiments the coolant temperature may be measured at any suitable location downstream from radiator 210 and upstream from the thermally managed component(s). In this regard, the method may comprise measuring coolant temperature ($T_{p,out}$). Control logic 300 may determine whether the measured coolant temperature is greater than a threshold temperature ($T_{threshold}$) and greater than an ambient temperature (Ta). In response to the measured coolant temperature being greater than both the threshold temperature and greater than an ambient temperature (e.g., an ambient air temperature), control logic 300 may command the bypass valve 214 to move to a radiator mode position whereby the bypass valve 214 controls the coolant to flow through the radiator 210. In response to the measured coolant temperature being less than either of the threshold temperature or the ambient temperature, control logic 300 may command the bypass valve 214 to move to a bypass mode position whereby the bypass valve 214 controls the coolant to bypass the radiator 210. In this regard, the method may comprise sending a valve position command ($V_{pos,3}$) to the bypass valve 214 to switch between radiator mode and bypass mode, based upon the measured coolant temperature ($T_{p,out}$). The bypass valve 214 is illustrated downstream from radiator 210 in FIG. 2; though in various embodiments the bypass valve 214 is located upstream from radiator 210, for example at junction 215.

Figure 4:
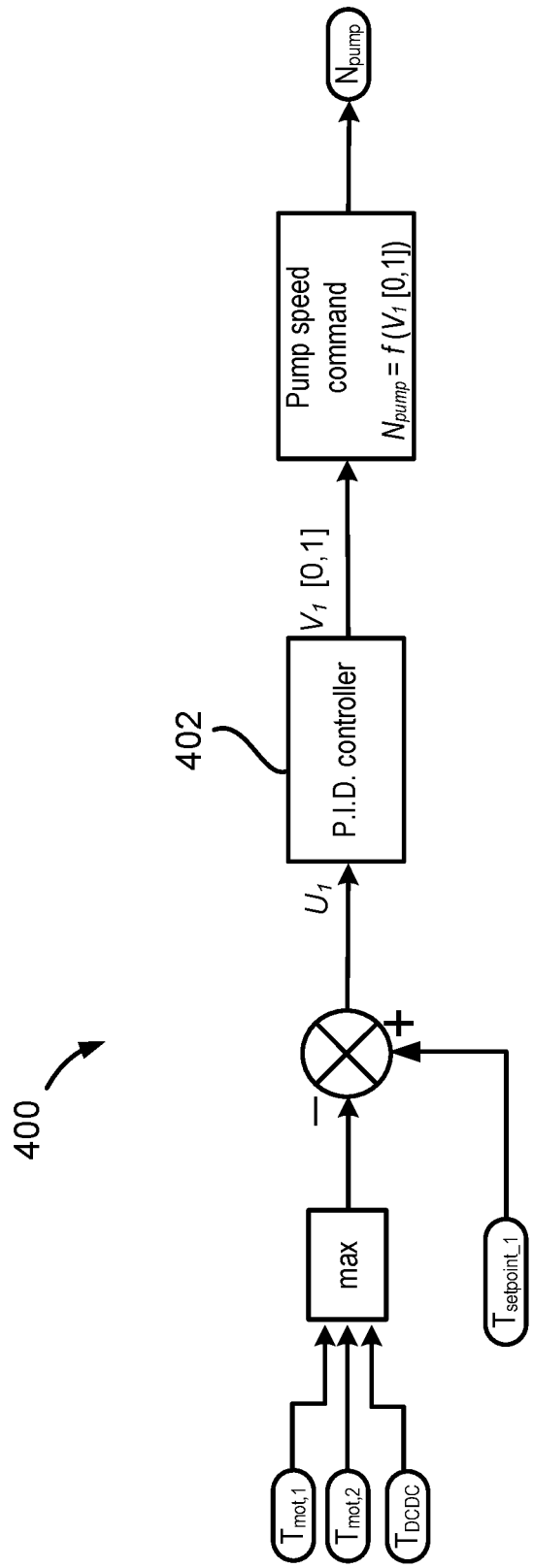
FIG. 4 illustrates a block diagram of control logic for implementing a method for powertrain loop pump control, in accordance with various embodiments.

With reference now to FIG. 4, a block diagram of control logic 400 for a thermal management system (e.g., powertrain thermal management system 200) is illustrated, in accordance with various embodiments. Control logic 400 may implement a method for managing thermal loads in an electric vehicle (e.g., a BEV and/or a FCEV). More specifically, and with combined reference to FIG. 2 and FIG. 4, control logic 400 may be implemented for regulating the powertrain loop pump speed ($N_{pump}$) of pump 218 (also referred to herein as a coolant pump) for the powertrain thermal management system 200. In this regard, the powertrain loop pump speed ($N_{pump}$) may be regulated using a PID (proportional-integral-derivative) controller 402 based on feedback of the coolant temperature (e.g., $T_{mot,1}$ and $T_{mot,2}$) at the outlet of each electric motor 232a and 232b, respectively, and the coolant temperature (e.g., $T_{DCDC}$) at the outlet of the DC-DC converter 226c. The difference between a first coolant temperature setpoint/reference (e.g., $T_{setpoint\_1}$ could be 65° C. or another suitable temperature as desired) and the maximum of measured temperatures (e.g., $T_{mot,1}$ and $T_{mot,2}$, and $T_{DCDC}$) at the outlets of each electric motor 232a and 232b and DC-DC converter 226c, respectively, is used as the error value ($U_1$) for the PID controller 402. This error value is minimized by the PID controller 402 by adjusting and optimizing the PID output variable ($V_1$) using proportional, integral, and/or derivative control actions. The output variable ($V_1$) may be a value between 0 and 1. The output variable ($V_1$) may then be used to compute the powertrain loop pump speed ($N_{pump}$), for example via a LUT (look-up table) or a polynomial expression. In this regard, the method may comprise sending a powertrain loop pump speed ($N_{pump}$) to the pump 218 to regulate the speed of pump 218, and thereby regulate the flow of coolant through inverters 230, electric motors 232, air compressor 220, brake resistor controller 222, and DC-DC converters 226, based upon the maximum of the measured coolant temperatures ($T_{mot,1}$, $T_{mot,2}$, and $T_{DCDC}$). The pump 218 may circulate the flow of coolant through the powertrain thermal management system 200.

Figure 5:
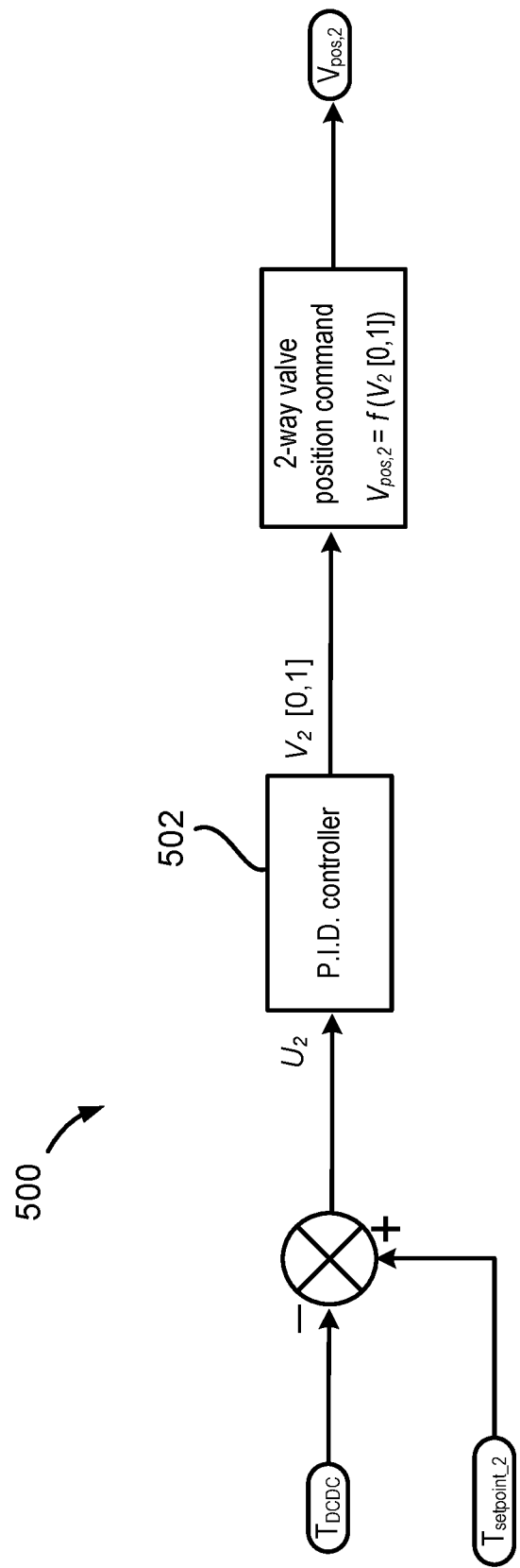
FIG. 5 illustrates a block diagram of control logic for implementing a method for two-way valve control, in accordance with various embodiments.

With reference now to FIG. 5, a block diagram of control logic 500 for a thermal management system (e.g., powertrain thermal management system 200) is illustrated, in accordance with various embodiments. Control logic 500 may implement a method for managing thermal loads in an electric vehicle (e.g., a BEV and/or a FCEV). More specifically, and with combined reference to FIG. 2 and FIG. 5, control logic 500 may be implemented for regulating a valve position of flow split valve 224 of powertrain thermal management system 200. The valve position of flow split valve 224 may be regulated using a PID controller 502 based on feedback of the coolant temperature (e.g., $T_{DCDC}$) at the outlet of DC-DC converter 226c. The difference between a second coolant temperature setpoint/reference (e.g., $T_{setpoint\_2}$ may be 65° C. or another suitable temperature as desired) and the measured temperature at the DC-DC converter outlet (e.g., the outlet of DC-DC converter 226c) is used as the error value ($U_2$) for the PID controller 502. This error value is minimized by the PID controller 502 by adjusting and optimizing the PID output variable ($V_2$) using proportional, integral, and/or derivative control actions. The output variable ($V_2$) may be a value between 0 and 1. The output variable is then used to compute the valve position ($V_{pos,2}$) (e.g., of flow split valve 224), for example via a LUT or a polynomial expression. In this regard, the method may comprise sending a valve position command ($V_{pos,2}$) to the split valve 224 to regulate the flow of coolant through split valve 224 and through the DC-DC converters 226.

Figure 6:
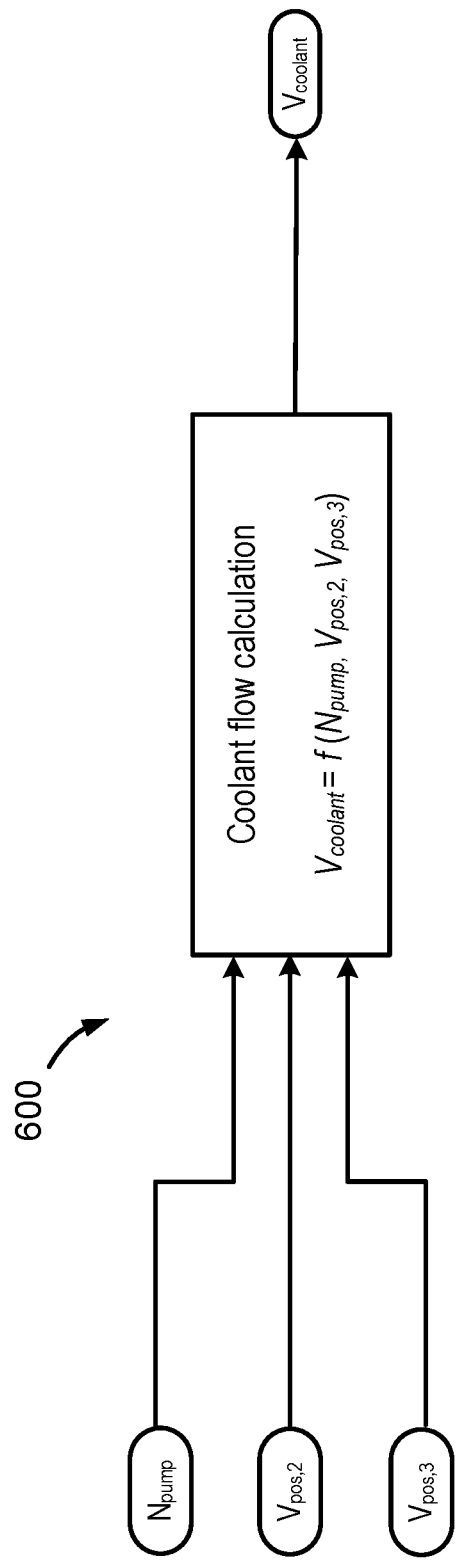
FIG. 6 illustrates a block diagram of control logic for implementing a method for coolant flow calculation, in accordance with various embodiments.

With reference now to FIG. 6, a block diagram of control logic 600 for a thermal management system (e.g., powertrain thermal management system 200) is illustrated, in accordance with various embodiments. Control logic 600 may implement a method for managing thermal loads in an electric vehicle (e.g., a BEV and/or a FCEV). More specifically, and with combined reference to FIG. 2 and FIG. 6, control logic 600 may be implemented for actively calculating a powertrain loop coolant flow rate ($V_{coolant}$). The pump speed command ($N_{pump}$), split valve position command ($V_{pos,2}$), and bypass valve position command ($V_{pos,3}$)—discussed above with respect to FIG. 3, FIG. 4, and FIG. 5—can be used to compute the powertrain loop coolant flow rate ($V_{coolant}$), for example via a 3D LUT or an empirical correlation. In various embodiments, the powertrain loop coolant flow rate ($V_{coolant}$) may be stored in memory and used for calculating a radiator fan speed as described with respect to FIG. 8.

Figure 7:
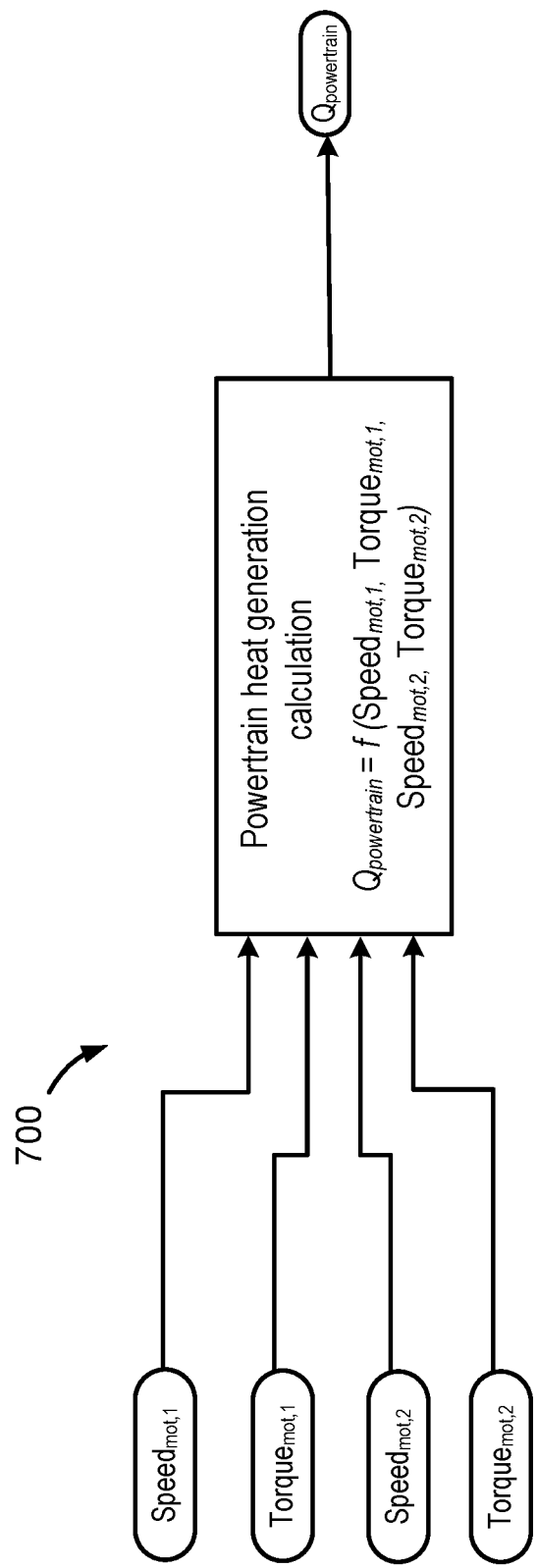
FIG. 7 illustrates a block diagram of control logic for implementing a method for powertrain heat generation calculation, in accordance with various embodiments.

With reference now to FIG. 7, a block diagram of control logic 700 for a thermal management system (e.g., powertrain thermal management system 200) is illustrated, in accordance with various embodiments. Control logic 700 may implement a method for managing thermal loads in an electric vehicle (e.g., a BEV and/or a FCEV). More specifically, and with combined reference to FIG. 2 and FIG. 7, control logic 700 may be implemented for actively calculating powertrain heat generation ($Q_{powertrain}$). In various embodiments, the powertrain heat generation ($Q_{powertrain}$) is calculated actively by a VCM (vehicle control module). The speed ($Speed_{mot,1}$ and $Speed_{mot,2}$) and torque ($Torque_{mot,1}$ and $Torque_{mot,2}$) are continuously measured for each electric motor 232a and 232b. Using the electric motor measurements, the powertrain heat generation ($Q_{powertrain}$) can be computed, for example via a LUT or an empirical correlation. In various embodiments, the powertrain heat generation ($Q_{powertrain}$) may be stored in memory and used for calculating a radiator fan speed as described with respect to FIG. 8.

Figure 8:
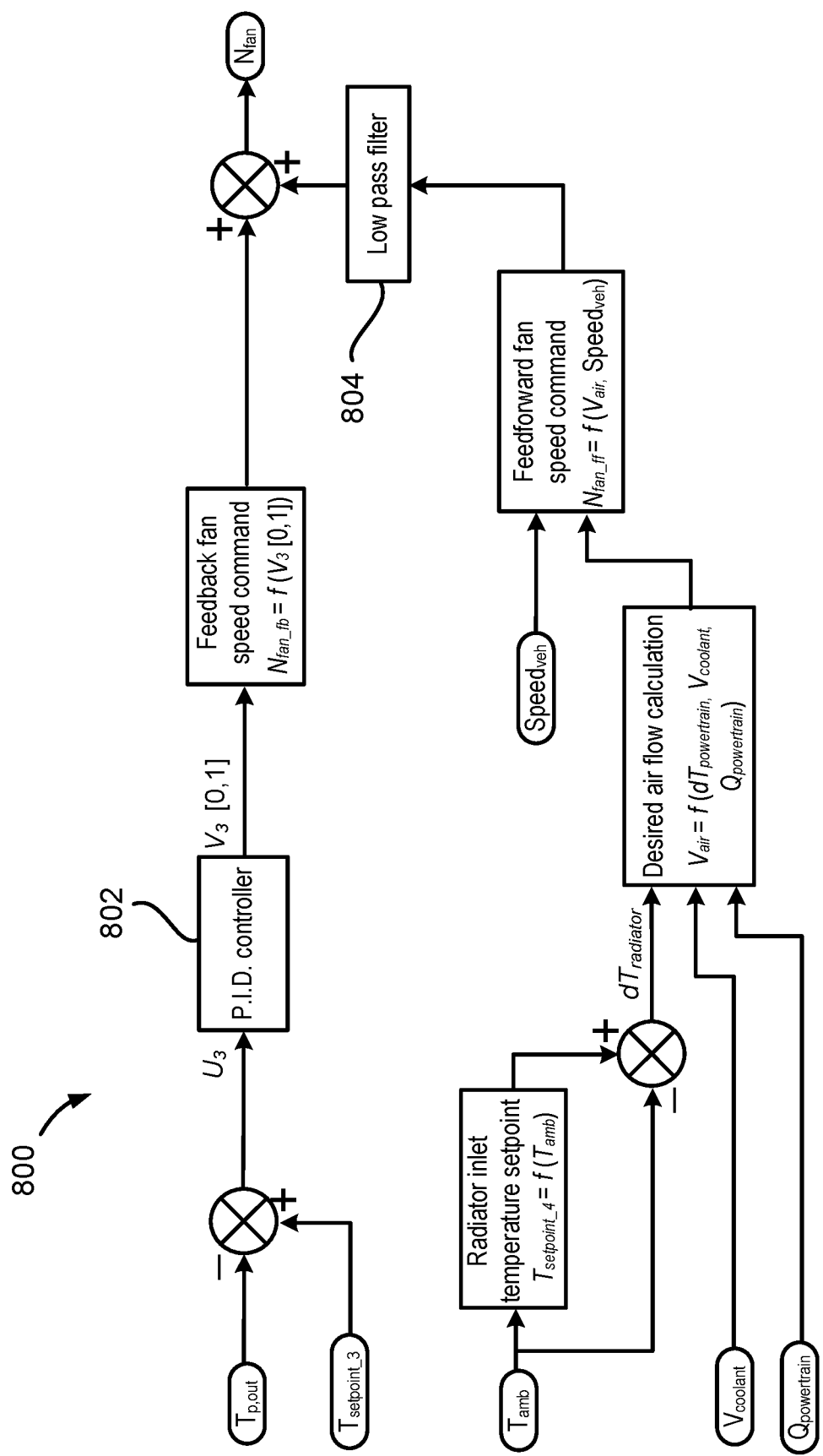
FIG. 8 illustrates a block diagram of control logic for implementing a method for radiator fan control, in accordance with various embodiments.

With reference now to FIG. 8, a block diagram of control logic 800 for a thermal management system (e.g., powertrain thermal management system 200) is illustrated, in accordance with various embodiments. Control logic 800 may implement a method for managing thermal loads in an electric vehicle (e.g., a BEV and/or a FCEV). More specifically, and with combined reference to FIG. 2 and FIG. 8, control logic 800 may be implemented for regulating powertrain loop radiator fan speed ($N_{fan}$). The powertrain loop radiator fan speed ($N_{fan}$) may be regulated using a combination of feedback control (PID) and feedforward control. Feedforward control tends to account for measured disturbances (for example, electric motor speed and torque during vehicle acceleration) using a process model before the measured disturbances affect the process. Feedback control tends to compensate for unmeasured disturbances by providing corrective action after they affect the process. The combined feedback and feedforward control tends to ensure smooth performance of the powertrain thermal management system 200.

The feedback portion of the fan speed command may be regulated using a PID controller 802 based on feedback of the coolant temperature ($T_{p,out}$) at the outlet of the pump 218. The difference between a third coolant temperature setpoint/reference (e.g., $T_{setpoint\_3}$ may be 60° C. or another suitable temperature as desired) and the measured temperature ($T_{p,out}$) at the pump 218 outlet is used as the error value ($U_3$) for the PID controller. This error value ($U_3$) may be minimized by the PID controller by adjusting and optimizing the PID output variable ($V_3$) using proportional, integral, and/or derivative control actions. The output variable ($V_3$) may be a value between 0 and 1. The output variable ($V_3$) is then used to compute the feedback part of the radiator fan speed command ($N_{fan\_fb}$), for example via a LUT or a polynomial expression.

For the feedforward controller, a process model (e.g., a heat transfer model) may be used to correlate the effect of measured disturbances (e.g., electric motor speed and torque) on the controlled variable (fan speed). The measured electric motor speed and torque may be used to calculate the powertrain heat generation as previously described with respect to FIG. 7. A radiator inlet coolant temperature setpoint ($T_{setpoint\_4}$) may be computed using the measured ambient temperature ($T_{amb}$), for example via a LUT or a polynomial expression. A radiator temperature differential ($dT_{radiator}$) may be defined as the difference between the radiator inlet coolant temperature setpoint ($T_{setpoint\_4}$) and the measured ambient temperature ($T_{amb}$). Using the powertrain heat generation ($Q_{powertrain}$), the powertrain loop coolant flow rate ($V_{coolant}$), and the radiator temperature differential ($dT_{radiator}$), the desired radiator air flow ($V_{air}$) may be computed, for example via a 3D LUT or an empirical radiator heat transfer model. The measured vehicle speed ($Speed_{web}$) can then be utilized along with the desired radiator air flow ($V_{air}$) to calculate the feedforward part of the radiator fan speed command ($N_{fan\_ff}$). A first order (or second order) low pass filter 804 (also referred to as a lag filter) may be applied to the feedforward part ($N_{fan\_ff}$) before it is added to the feedback part ($N_{fan\_fb}$) to obtain the final radiator fan speed ($N_{fan}$). In this regard, the method may comprise sending the final radiator fan speed ($N_{fan}$) to the radiator fan 212 to regulate the fan speed of radiator fan 212, thereby regulating the coolant temperature.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" or "at least one of A, B, and C" is used in the claims or disclosure, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching may be used throughout the figures to denote different parts but not necessarily to denote the same or different materials.

Methods, systems, and articles are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of managing thermal loads in an electric vehicle, the method comprising:
    heating a coolant of a powertrain coolant loop utilizing waste heat from at least one of an electric motor or a DC-DC converter;
    measuring a first coolant temperature;
    measuring a second coolant temperature downstream from the DC-DC converter;
    measuring a third coolant temperature downstream from the electric motor;
    measuring an ambient air temperature;
    calculating a coolant flow rate of the coolant;
    calculating a powertrain heat generation;
    calculating a feedback portion of a fan speed command using the first coolant temperature;
    calculating a feedforward portion of the fan speed command using the ambient air temperature, the coolant flow rate of the coolant, and the powertrain heat generation;
    performing a proportional-integral-derivative (PID) control using a maximum value of the second coolant temperature and the third coolant temperature to generate a first PID output variable;
    calculating a pump speed command using the first PID output variable and at least one of a lookup table or a polynomial expression; and
    controlling a fan speed of a radiator fan for the powertrain coolant loop based upon the feedback portion of the fan speed command and the feedforward portion of the fan speed command.

2. The method of claim 1, further comprising calculating the feedback portion of the fan speed command using a second PID output variable and at least one of a lookup table or a polynomial expression.

3. The method of claim 1, wherein the powertrain heat generation is calculated using a speed of the electric motor and a torque of the electric motor.

4. The method of claim 1, wherein the controlling the fan speed comprises sending the fan speed command to the radiator fan, and wherein the fan speed command comprises a sum of the feedback portion of the fan speed command and the feedforward portion of the fan speed command.

5. The method of claim 3, wherein the powertrain heat generation is calculated further using a speed of a second electric motor and a torque of the second electric motor.

6. The method of claim 1, further comprising sending the pump speed command to a coolant pump to regulate a flow of the coolant.

7. The method of claim 1, wherein the powertrain coolant loop comprises a flow split valve, and the method further comprises:
- measuring the second coolant temperature at an outlet of the DC-DC converter;
- calculating a difference between a DC-DC outlet temperature setpoint and the second coolant temperature to calculate an error value;
- performing a PID control using the error value to generate a third PID output variable;
- calculating a flow split valve command using the third PID output variable and at least one of a lookup table or a polynomial expression; and
- controlling a position of the flow split valve based upon the flow split valve command to regulate a flow of the coolant through the DC-DC converter.

* * * * *